(12) United States Patent
Janson et al.

(10) Patent No.: US 6,958,028 B2
(45) Date of Patent: Oct. 25, 2005

(54) RANGED DUAL CLUTCH TRANSMISSION FOR MOTOR VEHICLES

(75) Inventors: David Janson, Plymouth, MI (US); Reid Baldwin, Howell, MI (US); Donald E. Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 10/803,618

(22) Filed: Mar. 18, 2004

(65) Prior Publication Data

US 2005/0204837 A1  Sep. 22, 2005

(51) Int. Cl.[7] ............................ F16H 37/02; F16H 3/08

(52) U.S. Cl. .............................. 475/207; 74/331
(58) Field of Search ........................ 475/207, 218; 74/331

(56) References Cited

U.S. PATENT DOCUMENTS

| | | | | |
|---|---|---|---|---|
| 3,589,483 A | * | 6/1971 | Smith | 192/3.52 |
| 4,461,188 A | * | 7/1984 | Fisher | 74/330 |
| 6,595,077 B1 | * | 7/2003 | Geiberger et al. | 74/330 |

\* cited by examiner

*Primary Examiner*—Dirk Wright
(74) *Attorney, Agent, or Firm*—David B. Kelley; MacMillan, Sobanski & Todd

(57) ABSTRACT

A power transmission for a motor vehicle includes an input, first and second input shafts, a layshaft, drive elements connecting the input shafts to the output and layshaft, couplers, a first clutch for connecting and disconnecting the input and the first input shaft, and a second clutch for connecting and disconnecting the input and the second input shaft. A first torque path driveably connects the first input shaft to the layshaft. A second torque path driveably connects the second input shaft to the layshaft. A third torque path driveably connects the layshaft and output. A bridge torque path driveably connects the first input shaft and the output.

25 Claims, 5 Drawing Sheets

|  | Number of teeth |
|---|---|
| Pinion 82 | 21 |
| Gear 84 | 48 |
| Pinion 86 | 38 |
| Gear 88 | 42 |
| Pinion 102 | 41 |
| Gear 104 | 64 |
| Pinion 106 | 49 |
| Pinion 122 | 15 |
| Gear 124 | 36 |
| Pinion 126 | 77 |
| Gear 128 | 42 |
| Gear 154 | 37 |
| Pinion 158 | 15 |
| Pinion 172 | 44 |
| Gear 174 | 41 |

Fig. 3

| Gear | Torque Ratio | Step Size |
|---|---|---|
| 1$^{st}$ | 5.49 | |
| 2$^{nd}$ | 3.75 | 1.46 |
| 3$^{rd}$ | 2.65 | 1.41 |
| 4$^{th}$ | 1.81 | 1.46 |
| 5$^{th}$ | 1.25 | 1.45 |
| 6$^{th}$ | 0.85 | 1.46 |
| 7$^{th}$ | 0.60 | 1.41 |
| R1 | 5.11 | |
| R2 | 3.49 | 1.46 |
| R3 | 2.47 | 1.41 |

Fig. 4

|  | Number of teeth |
|---|---|
| Pinion 82 | 21 |
| Gear 84 | 48 |
| Pinion 86 | 38 |
| Gear 88 | 42 |
| Pinion 102 | 41 |
| Gear 104 | 64 |
| Pinion 106 | 59 |
| Gear 108 | 51 |
| Pinion 122 | 43 |
| Gear 124 | 41 |
| Pinion 126 | 58 |
| Gear 128 | 41 |
| Sun Gear 134 | 26 |
| Ring Gear 136 | 72 |
| Gear 154 | 51 |
| Pinion 158 | 55 |
| Gear 160 | 42 |
| Pinion 172 | 41 |
| Gear 174 | 51 |

Fig. 6

| Gear | Torque Ratio | Step Size |
|---|---|---|
| $1^{st}$ | 8.22 |  |
| $2^{nd}$ | 5.61 | 1.46 |
| $3^{rd}$ | 3.97 | 1.41 |
| $4^{th}$ | 2.49 | 1.60 |
| $5^{th}$ | 1.62 | 1.54 |
| $6^{th}$ | 1.10 | 1.46 |
| $7^{th}$ | 0.78 | 1.41 |
| $8^{th}$ | 0.61 | 1.28 |
| R1 | 8.20 |  |
| R2 | 5.60 | 1.46 |
| R3 | 3.96 | 1.41 |
| R4 | 3.10 | 1.28 |

Fig. 7

RANGED DUAL CLUTCH TRANSMISSION FOR MOTOR VEHICLES

BACKGROUND OF THE INVENTION

1. Field of the Invention

This invention relates to auto transmissions having a layshaft kinematic arrangement, particularly to such transmissions having input clutches but no torque converter.

2. Description of the Prior Art

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio by actuating couplers, and then restoring torque. A primary functional feature of ASM transmissions is the need to interrupt power transmitted from the engine to the transmission input shaft before or during each gear ratio change because the couplers cannot be actuated while transmitting power.

Dual clutch layshaft transmissions are essentially two ASM transmissions, one providing odd numbered gears and one providing even numbered gears. Shifts between odd numbered gears and even numbered gears can be accomplished without interrupting power flow. While operating in an odd gear, the couplers can be actuated to configure the transmission for the next even gear. Dual clutch transmissions have parasitic losses only slightly higher than ASM transmissions.

Layshaft automatic transmissions offer significant efficiency improvements over conventional step-change automatic transmissions with torque converters. Especially when applied to trucks, however, they must produce more torque multiplication than would be required of a transmission having a torque converter to avoid dissipating excessive energy in the clutch during launch of the vehicle from a stopped condition. This requirement for greater torque multiplication in the gearbox also compensates for the torque multiplication that a torque converter produces at lower speeds.

In order to share energy between the dual start-up clutches during launch, it is desirable to have small torque ratio steps between the launch gear ratio and the next higher gear ratio. But providing a large torque ratio span with relatively small ratio steps usually requires a large number of gears and couplers. It is preferable to minimize the number of gears and couplers to reduce package space and to lower cost.

SUMMARY OF THE INVENTION

This invention provides multiple forward gear ratios, yet it has a small number of gears and couplers because a range coupler selects between high and low range output ratios. One of the forward gear torque paths avoids transmitting torque through a range select coupler. While operating in that gear and without interrupting power flow between the engine and the transmission input, the state of the range coupler is changed to the high range in preparation for an upshift, and to the low range in preparation for a downshift. Furthermore, this transmission uses some of the pinion-gear meshes to produce multiple gear ratios, resulting in a low number of gears and couplers for the number of gear ratios produced. An additional advantage of this invention is the small torque ratio step between the gear ratio in which the vehicle is launched and the next higher gear ratio and the small torque ratio steps between other gear ratios.

Gear ratio changes are accomplished through the use of couplers, such as synchronizers or dog clutches, which mutually driveably connect components operative in each speed ratio. The couplers produce very little drag loss when engaged, and do not require a continuous supply of power to stay engaged.

These advantages are realized in a power transmission for a motor vehicle according to this invention that includes an input, first and second input shafts, a layshaft, drive elements connecting the input shafts to the output and layshaft, couplers, a first clutch for connecting and disconnecting the input and the first input shaft, and a second clutch for connecting and disconnecting the input and the second input shaft. A first torque path driveably connects the first input shaft to the layshaft. A second torque path driveably connects the second input shaft to the layshaft. A third torque path driveably connects the layshaft and output. A bridge torque path driveably connects the first input shaft and the output.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a chart containing an example of the number of teeth for each of the gears and pinions of the transmission shown in FIG. 2; and FIG. 4 is a chart containing the torque ratios between the input and output and steps between the torque ratios for each of the forward gears and the reverse gear of the transmission of FIG. 2, the gears and pinions having the number of teeth shown in FIG. 3.

FIG. 6 is a chart containing an example of the number of teeth for each of the gears and pinions of the transmission shown in FIG. 5; and FIG. 7 is a chart containing the torque ratios between the input and output and steps between the torque ratios for each of the forward gears and the reverse gear of the transmission of FIG. 5, the gears and pinions having the number of teeth shown in FIG. 6.

DETAILED DESCRIPTION OF THE PREFERRED EMBODIMENTS

Figure 1:
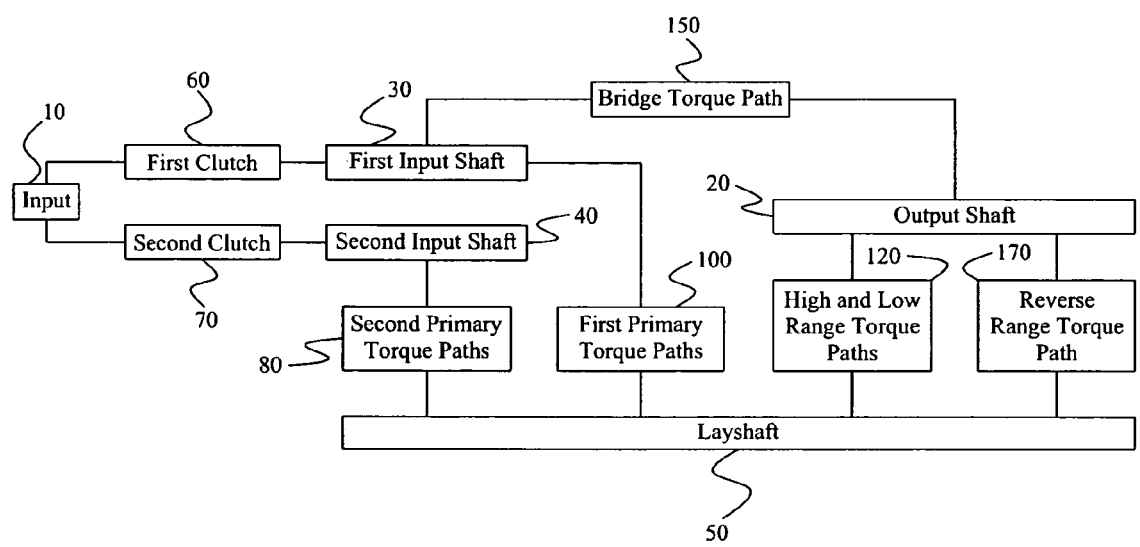
FIG. 1 is a diagram illustrating the functional components and their interconnection for a transmission according to the present invention.
Figure 2:
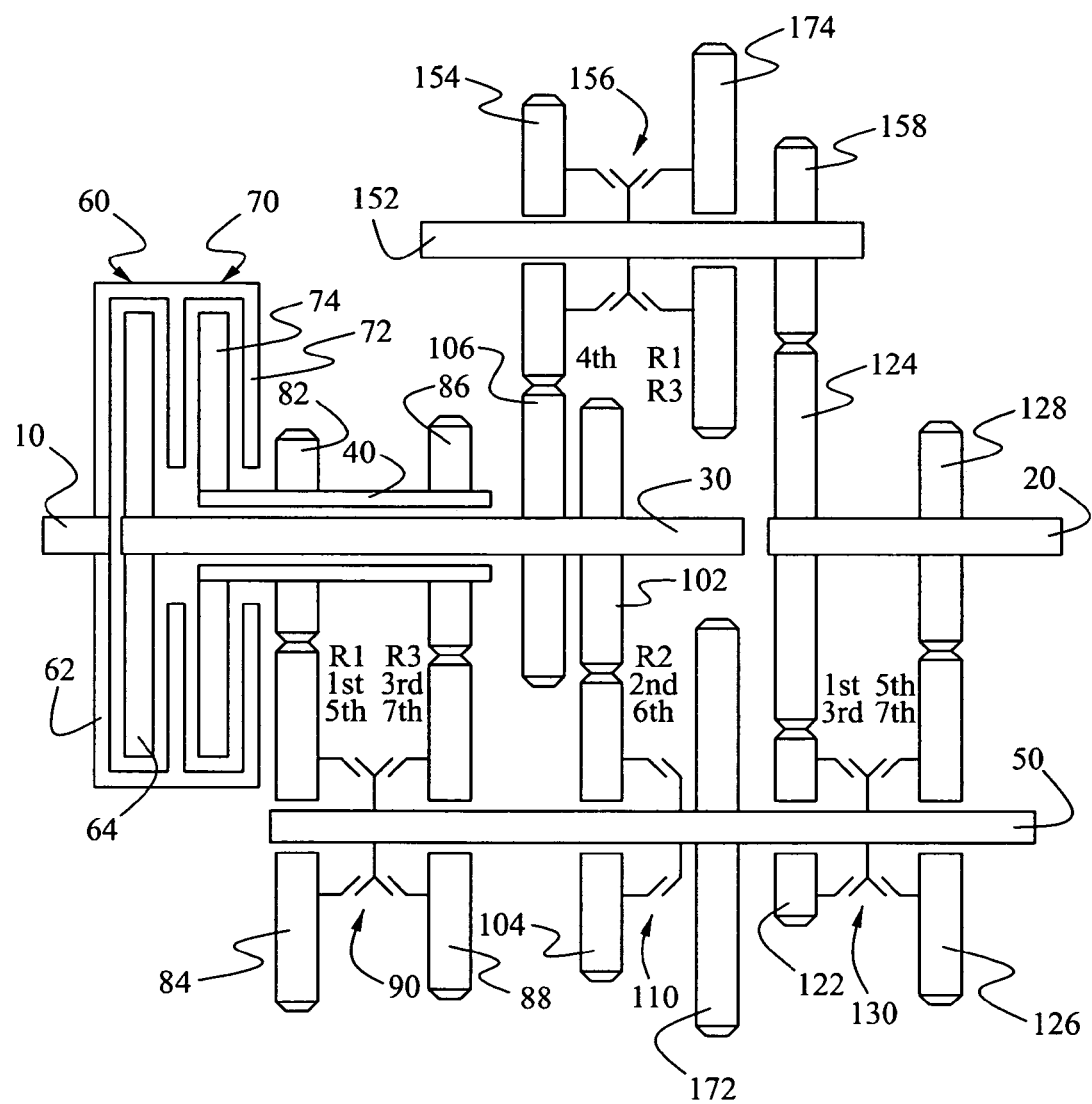
FIG. 2 is a schematic diagram showing a gear arrangement of a transmission according to the present invention.
Figure 5:
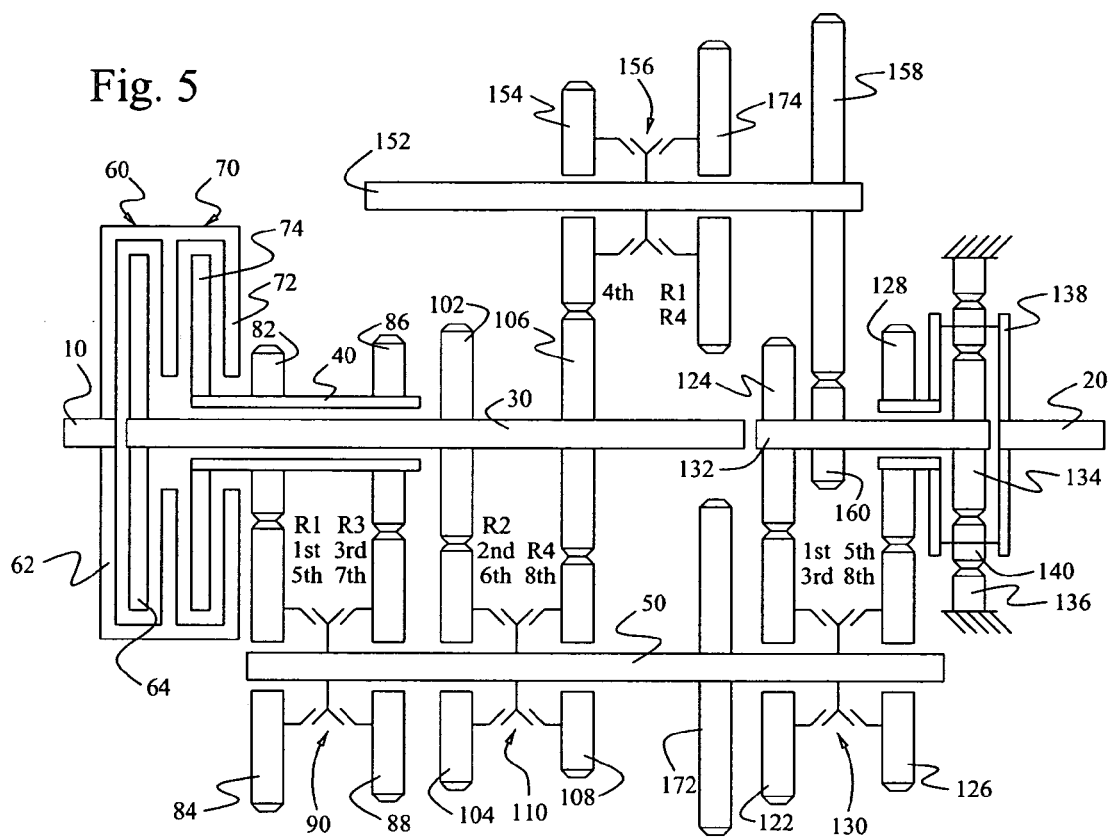
FIG. 5 is a schematic diagram showing a gear arrangement of a transmission according to the present invention.

Referring now to FIGS. 1, 2, and 5, a transmission according to the present invention includes an input 10 for driveably connecting a power source such as an internal combustion engine or electric motor to the transmission, and an output 20 for driving a load, such as the driven wheels of a motor vehicle, through a powertrain that may include a drive shaft, differential mechanism, and axle shafts.

A first friction clutch 60, consisting of a clutch housing 62 and a clutch disk 64, alternately connects and disconnects a first input shaft 30 as clutch 60 is engaged and disengaged, respectively. Similarly, a second friction clutch 70, consisting of a clutch housing 72 and a clutch disk 74, alternately connects and disconnects a second input shaft 40 as clutch 70 is engaged and disengaged, respectively. Second input shaft 40 is hollow so that it can be concentric with the first input shaft 30.

A layshaft 50 is arranged substantially parallel to the axis of the input 10 and input shafts 30, 40. A first set of primary torque paths 100 driveably connects the first input shaft 30 and the layshaft 50 with at least one selectable speed ratio and selectively releases this connection. In FIG. 2, the first set of primary torque paths 100 is implemented by pinion 102, secured to shaft 30; gear 104, journalled on layshaft 50 and meshing with pinion 102; and coupler 110. Coupler 110 is preferably a synchronizer of the type used in automotive manual transmissions to connect a gear or pinion to a shaft, after synchronizing the speed of the shaft and that of the pinion or gear. Coupler 110 alternately connects and disconnects gear 104 to layshaft 50. This implementation provides one selectable speed ratio between shaft 30 and layshaft 50. In FIG. 5, the first set of primary torque paths 100 is implemented by pinions 102 and 106, secured to shaft 30; gears 104 and 108 journalled on layshaft 50 and meshing with pinions 102 and 106, respectively; and coupler 110. Coupler 110 alternately connects gear 104 and gear 108 to layshaft 50, and coupler 110 disconnects gears 104 and 108 from layshaft 50. This implementation provides two selectable speed ratios between shaft 30 and layshaft 50.

A second set of primary torque paths 80 driveably connects the second input shaft 40 and the layshaft 50 with at least one selectable speed ratio and selectively releases this connection. In FIGS. 2 and 5, the second set of primary torque paths 80 is implemented by pinions 82 and 86, secured to shaft 40; gears 84 and 88, journalled on layshaft 50 and meshing with pinions 82 and 86, respectively, and coupler 90. Coupler 90 is preferably a synchronizer as described previously. Coupler 90 alternately connects gear 94 and gear 98 to layshaft 50, and coupler 90 disconnects gear 94 and 98 from layshaft 50. This implementation provides two selectable speed ratios between shaft 40 and layshaft 50.

A set of range torque paths 120 driveably connects the layshaft 50 and the output shaft 20 with two selectable speed ratios and selectively releases this connection. In FIG. 2, the set of range torque paths 120 is implemented by pinions 122 and 126, journalled on layshaft 50; gears 124 and 128, secured to output shaft 20 and meshing with pinions 122 and 126, respectively; and coupler 130. Coupler 130 is preferably a synchronizer as described previously. Coupler 130 alternately connects pinion 122 and pinion 126 to layshaft 50, and coupler 130 disconnects pinions 122 and 126 from layshaft 50. In FIG. 5, a planetary gearset includes a sun gear 134, secured to an auxiliary shaft 132; a ring gear, secured to the transmission case against rotation; a planet carrier 138, secured to the output shaft 20; and a set of planet gears 140, supported on the planet carrier and meshing with the sun gear 134 and the ring gear 136. The set of range torque paths 120 is implemented by pinions 122 and 126, journalled on layshaft 50; gear 124, secured to the auxiliary shaft 132 and meshing with pinion 122; gear 128, secured on planet carrier 138 and meshing with pinion 126; and coupler 130. Coupler 130 is preferably a synchronizer as described previously. Coupler 130 alternately connects pinion 122 and pinion 126 to layshaft 50, and coupler 130 disconnects pinions 122 and 126 from layshaft 50. The addition of the planetary gearset allows the low range torque path to provide substantially more torque multiplication than the arrangement of FIG. 2.

A selectable bridge torque path 150 driveably connects the first input shaft 30 with the output shaft 20 and selectively releases this connection. In FIG. 2, the bridge torque path 150 is implemented by pinion 106, secured to shaft 30; gear 154, journalled on an idler shaft 152 and meshing with pinion 106; pinion 158, secured to idler shaft 152; gear 124, secured to output shaft 20 and meshing with pinion 158; and coupler 156. Coupler 156 is preferably a synchronizer as described previously. Coupler 156 alternately connects and disconnects gear 154 to idler shaft 152. In FIG. 5, the bridge torque path 150 is implemented similarly, except that pinion 158 meshes with gear 160, secured to auxiliary shaft 132, instead of to gear 124, thereby utilizing the planetary speed reduction described above. In FIG. 5, pinion 106 is utilized in both the second set of primary torque paths 100 and the bridge torque path 150.

A selectable reverse range torque path 170 driveably connects the layshaft 50 with the output shaft 20 and selectively releases this connection. In FIG. 2, the reverse range torque path 170 is implemented by pinion 172, secured to layshaft 50; gear 174, journalled on idler shaft 152 and meshing that meshes with pinion 172; pinion 158, secured to idler shaft 152; gear 124, secured to output shaft 20 and meshing with pinion 158, and coupler 156. Coupler 156 alternately connects and disconnects gear 174 to idler shaft 152. Note that several components are utilized in both the bridge torque path 150 and the reverse range torque path 170. In FIG. 5, the reverse range torque path 170 is implemented similarly, except that pinion 158 meshes with gear 160, secured to auxiliary shaft 132, instead of gear 124, thereby utilizing the planetary speed reduction described above.

Operation of the transmission will be discussed next with reference to the positional state of the coupler sleeves and the applied and released state of clutches 60 and 70. The following discussion applies to both the arrangements of FIGS. 2 and 5.

When the transmission operates in first gear through third gear, range coupler 130 is in the low range, i.e., its sleeve is moved leftward to connect low range pinion 122 and layshaft 50. When the transmission operates in the fifth through eighth forward gears, range coupler 130 is in the high range, i.e., its sleeve is moved rightward to connect high range pinion 126 and layshaft 50. While operating in fourth gear, the state of range coupler 130 can be changed to the high range in preparation for an upshift, or the state of range coupler 130 can be changed to the low range in preparation for a downshift.

The first forward gear ratio is produced by first moving the selector sleeve of coupler 90 leftward to connect gear 84 to layshaft 50, and then engaging friction clutch 70. Power is transferred from the input, through clutch 70, shaft 40, pinion 82, gear 84, coupler 90, to layshaft 50. A second speed reduction and torque multiplication occurs in the low range torque path. In FIG. 2, the low range torque path is from layshaft 50, coupler 130, pinion 122, gear 124, to the output shaft 20. In FIG. 5, the low range torque path is from layshaft 50, coupler 130, pinion 122, gear 124, auxiliary shaft 132, sun gear 134, planet gears 140, carrier 138, to the output shaft 20.

The transmission produces an upshift to the second gear from the first gear by moving the sleeve of coupler 110 leftward, thereby connecting gear 104 to layshaft 50. Disengaging clutch 70 and engaging clutch 60 transfers the power to the second gear power path. Power is now transferred from the input, through clutch 60, shaft 30, pinion 102, gear 104, coupler 110, to layshaft 50. Power continues to be transferred from layshaft 50 to the output shaft 20 via the low range power path described above.

The transmission produces an upshift to the third gear from the second gear by moving the sleeve of coupler 90 rightward, thereby connecting gear 88 to layshaft 50. Disengaging clutch 60 and engaging clutch 70 transfers the power to the third gear power path. Power is now transferred from the input, through clutch 70, shaft 40, pinion 86, gear 88, coupler 90, to layshaft 50. Power continues to be transferred from layshaft 50 to the output shaft 20 via the low range power path described above. Coupler 110 is now moved to the neutral position to disengage gear 104 from layshaft 50.

The transmission produces an upshift to fourth gear from third gear by moving the selector sleeve of coupler 156 leftward to driveably connect gear 154 to idler shaft 152. Then disengaging clutch 70, engaging clutch 60 transfers power to the fourth gear power path. Power is now transferred from the input, through clutch 60, shaft 30, pinion 106, gear 154, coupler 156, to idler shaft 152. In FIG. 2, the power path continues from idler shaft 152, pinion 158, gear 124, to the output shaft 20. In FIG. 5, the power path continues from idler shaft 152, pinion 158, gear 160, auxiliary shaft 132, sun gear 134, planet gears 140, carrier 138, to the output shaft 20.

While in fourth gear, the selector sleeve of coupler 130 is moved rightward to driveably connect pinion 126 to layshaft 50, thereby selecting high range. However, no power is transferred through the high range torque path until the shift into fifth gear is initiated.

The transmission produces an upshift to the fifth gear from the fourth gear by moving the sleeve of coupler 90 leftward, thereby connecting gear 84 to layshaft 50. Disengaging clutch 60 and engaging clutch 70 transfers the power to the fifth gear power path. In FIG. 2, power is now transferred from the input, through clutch 70, shaft 40, pinion 82, gear 84, coupler 90, to layshaft 50. Power is transferred from layshaft 50 to output shaft 20 via the high range torque path, from layshaft 50, coupler 130, pinion 126, gear 128, to the output shaft 20. In FIG. 5, torque is transmitted from layshaft 50, coupler 130, pinion 126, gear 128, carrier 138 to output shaft 20. The high range torque path of FIG. 5 is a direct drive through the planetary gearset.

The transmission produces an upshift to the sixth gear from the fifth gear by moving the sleeve of coupler 110 leftward, thereby connecting gear 104 to layshaft 50. Disengaging clutch 70 and engaging clutch 60 transfers the power to the sixth gear power path. Power is now transferred from the input, through clutch 60, shaft 30, pinion 102, gear 104, coupler 110, to layshaft 50. Power continues to be transferred from layshaft 50 to the output shaft 20 via the high range power path described above.

The transmission produces an upshift to the seventh gear from the sixth gear by moving the sleeve of coupler 90 rightward, thereby connecting gear 88 to layshaft 50. Disengaging clutch 66 and engaging clutch 70 transfers the power to the seventh gear power path. Power is now transferred from the input, through clutch 70, shaft 40, pinion 86, gear 88, coupler 90, to layshaft 50. Power continues to be transferred from layshaft 50 to the output shaft 20 via the high range power path described above.

The transmission of FIG. 5 produces an upshift to the eighth gear from the seventh gear by moving the sleeve of coupler 110 rightward, thereby connecting gear 108 to layshaft 50. Disengaging clutch 70 and engaging clutch 60 transfers the power to the eighth gear power path. Power is now transferred from the input, through clutch 60, shaft 30, pinion 106, gear 108, coupler 110, to layshaft 50. Power continues to be transferred from layshaft 50 to the output shaft 20 via the high range power path described above.

Downshifts are accomplished by reversing the steps for an upshift.

To select reverse range, the selector sleeve of coupler 156 is moved rightward to connect gear 174 to idler shaft 152. The selector sleeve of coupler 130 must be in the neutral position so that neither low range nor high range are selected. In FIG. 2, the reverse range torque path is from layshaft 50, pinion 172, gear 174, coupler 156, idler shaft 152, pinion 158, gear 124, to the output shaft 20. In FIG. 5, the low range torque path is from layshaft 50, pinion 172, gear 174, coupler 156, idler shaft 152, pinion 158, gear 160, auxiliary shaft 132, sun gear 134, planet gears 140, carrier 138, to the output shaft 20.

The first reverse gear ratio is produced by first moving the selector sleeve of coupler 90 leftward to connect gear 84 to layshaft 50, and then engaging friction clutch 70. Power is transferred from the input, through clutch 70, shaft 40, pinion 82, gear 84, coupler 90, to layshaft 50. A second speed reduction and torque multiplication occurs in the reverse range torque path as described above.

The sequence of actions to upshift from the first reverse gear to the second reverse gear and then to the third reverse gear are the same as the corresponding steps in forward drive.

The transmission of FIG. 5 produces an upshift to the fourth reverse gear from the third reverse gear by moving the sleeve of coupler 110 rightward, thereby connecting gear 108 to layshaft 50. Disengaging clutch 70 and engaging clutch 60 transfers the power to the eighth gear power path. Power is now transferred from the input, through clutch 60, shaft 30, pinion 106, gear 108, coupler 110, to layshaft 50. Power continues to be transferred from layshaft 50 to the output shaft 20 via the reverse range power path described above.

Operation of a transmission according to this invention is described in general for any transmission having the functional components illustrated in FIG. 1. A set of primary torque paths is used in both low range, high range, and reverse range. The torque ratios for the low range torque path, high range torque path, and bridge torque path are chosen such that the bridge torque path produces a higher output speed than the highest primary torque path in conjunction with the low range torque path, and the bridge torque path produces a lower output speed than the lowest primary torque path in conjunction with the high range torque path. There may be additional primary torque paths which are used in only one forward range and reverse range, as was the case for eighth gear and fourth reverse in FIG. 5.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed power transmission, comprising:
   first and second input shafts;
   an output shaft;
   a layshaft;
   a first set of selectable torque paths between the first input shaft and layshaft;
   a second set of selectable torque paths between the second input shaft and layshaft;
   a third set of selectable torque paths between the layshaft and the output shaft; and
   a selectable bridge torque path between the first input shaft and the output shaft.

2. The transmission of claim 1, further comprising:
   an input;
   a first clutch driveably connected to the input and first input shaft for alternately connecting and disconnecting the input and the first input shaft; and
   a second clutch driveably connected to the input and second input shaft for alternately connecting and disconnecting the input and the second input shaft.

3. The transmission of claim 1, wherein the first set of torque paths comprises:
   first and second pinions secured to the first input shaft;
   first and second gears journalled on the layshaft and in continuous meshing engagement with the first and second pinions, respectively; and
   a first coupler secured to the layshaft for releasably coupling the first gear and second gear alternately to the layshaft.

4. The transmission of claim 1, wherein the first set of torque paths comprises:
   a first pinion secured to the first input shaft;
   a first gear journalled on the layshaft and in continuous meshing engagement with the first pinion; and
   a first coupler secured to the layshaft for releasably coupling the first gear to the layshaft.

5. The transmission of claim 1, wherein the second set of torque paths comprises:
   third and fourth pinions secured to the second input shaft;
   third and fourth gears journalled on the layshaft and in continuous meshing engagement with the third and fourth pinions, respectively; and
   a second coupler secured to the layshaft for releasably coupling the third gear and fourth gear alternately to the layshaft.

6. The transmission of claim 1, wherein the third set of torque paths comprises:
   a low range selectable torque path; and
   a high range selectable torque path.

7. The transmission of claim 6, wherein the third set of torque paths further comprises:
   a reverse range selectable torque path that causes the output shaft to rotate in an opposite direction from a direction of rotation of the output shaft produced by the low range torque path and the high range torque path.

8. The transmission of claim 1, wherein the third set of torque paths comprises:
   fifth and sixth pinions journalled on the layshaft;
   fifth and sixth gears secured to the output shaft and in continuous meshing engagement with the fifth and sixth pinions, respectively; and
   a third coupler secured to the layshaft for releasably coupling the fifth pinion and sixth pinion alternately to the layshaft.

9. The transmission of claim 8, wherein the third set of torque paths further comprises:
   an idler shaft;
   a seventh pinion secured to the layshaft;
   a seventh gear journalled on the idler shaft and driveably connected to the seventh pinion;
   an eighth pinion secured to the idler shaft in continuous meshing engagement with the fifth gear; and
   a fourth coupler secured to the idler shaft for releasably coupling the seventh gear to the idler shaft.

10. The transmission of claim 1, wherein the third set of torque paths comprises:
    an auxiliary shaft;
    a sun gear secured to the auxiliary shaft;
    a planet carrier driveably connected to the output shaft;
    a ring gear secured against rotation;
    a set of planet gears supported on the planet carrier and in continuous meshing engagement with the sun gear and ring gear;
    ninth and tenth pinions journalled on the layshaft;
    a ninth gear secured to the auxiliary shaft and in continuous meshing engagement with the ninth pinion;
    a tenth gear driveably connected to the output shaft and in continuous meshing engagement with the tenth pinion; and
    a third coupler secured to the layshaft for releasably coupling the ninth pinion and tenth pinion alternately to the layshaft.

11. The transmission of claim 10, wherein the third set of torque paths further comprises:
    an idler shaft;
    a seventh pinion secured to the layshaft;
    a seventh gear journalled on the idler shaft and driveably connected to the seventh pinion;
    an eleventh pinion secured to the idler shaft;
    an eleventh gear secured to the auxiliary shaft and in continuous meshing engagement with the eleventh pinion; and
    a fourth coupler secured to the idler shaft for releasably coupling the seventh gear to the idler shaft.

12. The transmission of claim 8, wherein the bridge torque path comprises:
    an idler shaft;
    a second pinion secured to the first input shaft;
    a second gear journalled on the idler shaft and in continuous meshing engagement with the second pinion;
    an eighth pinion secured to the idler shaft;
    a fifth gear secured to the output shaft and in continuous meshing engagement with the eighth pinion; and
    a fourth coupler secured to the idler shaft for releasably coupling the second gear to the idler shaft.

13. The transmission of claim 10 wherein the bridge torque path comprises:
    a first pinion secured to the first input shaft;
    an idler shaft;
    an eleventh pinion secured to the idler shaft;
    an eleventh gear secured to the auxiliary shaft and in continuous meshing engagement with the eleventh pinion;
    a thirteenth gear journalled on the idler shaft and in continuous meshing engagement with the first pinion; and
    a fourth coupler secured to the idler shaft for releasably coupling the thirteenth gear to the idler shaft.

14. A multiple speed power transmission, comprising:

an input;

first and second input shafts;

a first clutch driveably connected to the input and first input shaft for alternately connecting and disconnecting the input and the first input shaft;

a second clutch driveably connected to the input and second input shaft for alternately connecting and disconnecting the input and the second input shaft;

an output shaft;

a layshaft;

a first set of selectable torque paths between the first input shaft and layshaft;

a second set of selectable torque paths between the second input shaft and layshaft;

a third set of selectable torque paths between the layshaft and the output shaft; and a selectable bridge torque path between the first input shaft and the output shaft.

15. The transmission of claim 14, wherein the first set of torque paths comprises:

first and second pinions secured to the first input shaft;

first and second gears journalled on the layshaft and in continuous meshing engagement with the first and second pinions, respectively; and a first coupler secured to the layshaft for releasably coupling the first gear and second gear alternately to the layshaft.

16. The transmission of claim 14, wherein the first set of torque paths comprises:

a first pinion secured to the first input shaft;

a first gear journalled on the layshaft and in continuous meshing engagement with the first pinion; and a first coupler secured to the layshaft for releasably coupling the first gear to the layshaft.

17. The transmission of claim 14, wherein the second set of torque paths comprises:

third and fourth pinions secured to the second input shaft;

third and fourth gears journalled on the layshaft and in continuous meshing engagement with the third and fourth pinions, respectively; and a second coupler secured to the layshaft for releasably coupling the third gear and fourth gear alternately to the layshaft.

18. The transmission of claim 14, wherein the third set of torque paths comprises:

a low range selectable torque path; and a high range selectable torque path.

19. The transmission of claim 18, wherein the third set of torque paths further comprises:

a reverse range selectable torque path that causes the output shaft to rotate in an opposite direction from a direction of rotation of the output shaft produced by the low range torque path and the high range torque path.

20. The transmission of claim 14, wherein the third set of torque paths comprises:

fifth and sixth pinions journalled on the layshaft;

fifth and sixth gears secured to the output shaft and in continuous meshing engagement with the fifth and sixth pinions, respectively; and a third coupler secured to the layshaft for releasably coupling the fifth pinion and sixth pinion alternately to the layshaft.

21. The transmission of claim 20, wherein the third set of torque paths further comprises:

an idler shaft;

a seventh pinion secured to the layshaft;

a seventh gear journalled on the idler shaft and driveably connected to the seventh pinion;

an eighth pinion secured to the idler shaft in continuous meshing engagement with the fifth gear; and a fourth coupler secured to the idler shaft for releasably coupling the seventh gear to the idler shaft.

22. The transmission of claim 14, wherein the third set of torque paths comprises:

an auxiliary shaft;

a sun gear secured to the auxiliary shaft;

a planet carrier driveably connected to the output shaft and auxiliary shaft;

a ring gear secured against rotation;

a set of planet gears supported on the planet carrier and in continuous meshing engagement with the sun gear and ring gear;

ninth and tenth pinions journalled on the layshaft;

a ninth gear secured to the auxiliary shaft and in continuous meshing engagement with the ninth pinion;

a tenth gear driveably connected to the output shaft and in continuous meshing engagement with the tenth pinion; and a third coupler secured to the layshaft for releasably coupling the ninth pinion and tenth pinion alternately to the layshaft.

23. The transmission of claim 22, wherein the third set of torque paths further comprises:

an idler shaft;

a seventh pinion secured to the layshaft;

a seventh gear journalled on the idler shaft and driveably connected to the seventh pinion;

an eleventh pinion secured to the idler shaft;

an eleventh gear secured to the auxiliary shaft and in continuous meshing engagement with the eleventh pinion; and a fourth coupler secured to the idler shaft for releasably coupling the seventh gear to the idler shaft.

24. The transmission of claim 21, wherein the bridge torque path comprises:

an idler shaft;

a second pinion secured to the first input shaft;

a second gear journalled on the idler shaft and in continuous meshing engagement with the second pinion;

an eighth pinion secured to the idler shaft;

a fifth gear secured to the output shaft and in continuous meshing engagement with the eighth pinion; and a fourth coupler secured to the idler shaft for releasably coupling the second gear to the idler shaft.

25. The transmission of claim 22, wherein the bridge torque path comprises:

a first pinion secured to the first input shaft;

an idler shaft;

an eleventh pinion secured to the idler shaft;

an eleventh gear secured to the auxiliary shaft and in continuous meshing engagement with the eleventh pinion;

a thirteenth gear journalled on the idler shaft and in continuous meshing engagement with the first pinion; and a fourth coupler secured to the idler shaft for releasably coupling the thirteenth gear to the idler shaft.

* * * * *